(12) United States Patent
Brown

(10) Patent No.: US 6,194,522 B1
(45) Date of Patent: Feb. 27, 2001

(54) CROSSLINKABLE COMPOSITIONS

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/234,543

(22) Filed: Jan. 21, 1999

Related U.S. Application Data

(62) Division of application No. 08/756,208, filed on Nov. 25, 1996, now Pat. No. 5,936,043
(60) Provisional application No. 60/009,096, filed on Dec. 22, 1995.

(51) Int. Cl.$^7$ ........................................................ C08F 8/30
(52) U.S. Cl. ................................................................ 525/374
(58) Field of Search ................................................ 525/374

(56) References Cited

U.S. PATENT DOCUMENTS

| | | |
|---|---|---|
| 4,487,964 | 12/1984 | Watson, Jr. et al. . |
| 4,910,339 | 3/1990 | Hennig et al. . |
| 4,954,559 | 9/1990 | Hartog et al. . |
| 4,977,219 | 12/1990 | Watson, Jr. . |
| 5,047,588 | 9/1991 | Taylor . |
| 5,066,705 | 11/1991 | Wickert . |
| 5,081,173 | 1/1992 | Taylor . |
| 5,136,006 | 8/1992 | Sundararaman et al. . |
| 5,258,481 | 11/1993 | Hesselmans et al. . |
| 5,276,096 | 1/1994 | Serdiuk et al. ...................... 525/123 |
| 5,352,400 | 10/1994 | West ...................................... 564/252 |
| 5,373,080 | 12/1994 | Imashiro et al. . |

FOREIGN PATENT DOCUMENTS

| | | |
|---|---|---|
| 18924.88 | 2/1983 | (AT) . |
| 0 121 083 | 2/1984 | (EP) . |
| 0259 511 | 11/1986 | (EP) . |
| 0241 805 | 3/1987 | (EP) . |
| 0277 361 | 12/1987 | (EP) . |
| 0 274 402 | 1/1988 | (EP) . |
| 1056202 | 5/1965 | (GB) . |

*Primary Examiner*—Christopher Henderson
(74) *Attorney, Agent, or Firm*—Ronald D. Bakule

(57) ABSTRACT

A method for crosslinking a polymer composition including an aliphatic polycarbodiimide and a polymer containing at least two sulfur- or phosphorous-containing acid groups such as copolymerized 2-(meth)acrylamido-2-methyl-1-propanesulfonic acid, 3-sulfopropyl(meth)acrylate, 2-sulfoethyl(meth)acrylate or 2-phosphoethyl(meth)acrylate is provided. The method provides the benefits of a crosslinked composition such as solvent resistance without materially affecting film formation.

2 Claims, No Drawings

CROSSLINKABLE COMPOSITIONS

This is a divisional of appllcation Ser. No. 08/756,208, filed Nov. 25, 1996, now U.S. Pat. No. 5,936,043 which is a nonprovisional application of prior pending provisional application Ser. No. 60/009,096, filed Dec. 22, 1995.

The present invention relates to crosslinkable compositions. In particular, the present invention relates to compositions which include a polymer having sulfur and/or phosphorus-containing acid groups and an aliphatic polycarbodiimide cross-linker. The crosslinkable compositions include film-forming compositions such as paints, lacquers, varnishes, sealants, nonwoven fabric binders, leather coatings, and adhesives.

It is well-known that the addition of a cross-linker to a film forming coating formulation can improve certain important properties of the formed coating, such as its hardness, solvent resistance and mar resistance. However, it is desirable to have a crosslinking mechanism which is operative during or after film formation. If the cross-linking mechanism has proceeded materially before film formation has been substantially completed, the overall film formation process will be compromised and the resultant film will be weak and porous with the result that the protective functions of the film will be severely impaired. In some applications heat may be used to assist film formation and crosslinking. However, in many cases, heat is not available so the crosslinking mechanism is desirably triggered under ambient conditions before film formation is complete.

Carbodiimides having the general structural formula of r-(N=C=N-r')x, wherein r and r' are aliphatic and/or aromatic groups, have been used as cross-linkers. In this regard, U.S. Pat. No. 4,977,219, EP-A-0277361, et al. disclose aliphatic polycarbodiimide cross-linkers, wherein both r and r' are aliphatic groups. EP-A-0277361 discloses a mixed aliphatic and aromatic polycarbodiimide cross-linker, wherein each crosslinker molecule contains some aliphatic and some aromatic carbodiimides. EP A-0628582 discloses the use of aromatic polycarbodiimide crosslinkers, wherein both r and r' are aromatic groups. In all the references cited above, the use of polycarbodiimide crosslinkers is taught in conjunction with carboxylic acid- or carboxylate-containing polymers, and the crosslinking reaction takes place between the carbodiimide groups and the carboxylic acid or carboxylate groups on the polymer. U.S. Pat. No. 5,352,400 discloses that polymers containing carbodiimide groups derived from alpha-methylstyryl-containing isocyanates can be used to crosslink any polymers with active hydrogen atoms which may be present in various groups, including phosphoric acid and partial esters thereof. However, compositions incorporating carboxylic acid containing-polymers, over which the present invention is an improvement, are preferred for crosslinking with polycarbodiimides.

Even though aliphatic polycarbodiimide cross-linkers are used commercially with carboxylate-containing polymers, they do suffer from certain draw backs. In particular, with the aliphatic polycarbodiimide crosslinkers, crosslinking with carboxylate groups is too rapid with the result that the crosslinking mechanism is substantially completed before film formation is completed. Therefore, despite the fact that a rapid cross-linking step will generally lead to an increase in cross-link density and possibly to improvements in solvent resistance, it detracts from the process of film formation. For example, there is a decrease in the important property of mar resistance. The rapid cross-linking therefore leads to the formation of generally poor and brittle coatings as they are not well-knitted. While aromatic polycarbodiimide crosslinkers react more slowly with carboxylate groups than do aliphatic polycarbodiimides, and consequently give coatings with improved mar resistance, the resulting films tend to discolor in the presence of UV light, which is undesirable in many applications.

The present invention seeks to overcome the problems associated with the prior art coatings. In particular, the present invention seeks to provide relatively non-toxic crosslinking coating compositions, which yield good performance, non-yellowing films.

According to a first aspect of the present invention there is provided a crosslinkable composition including a polymer bearing at least two sulfur- or phosphorous-containing acid groups and an aliphatic polycarbodiimide. According to a second aspect of the present invention there is provided a method of crosslinking a polymer composition by forming a polymer bearing at least two sulfur- or phosphorous-containing acid groups, admixing an aliphatic polycarbodiimide, and curing the coating.

An advantage of the present invention is that aliphatic polycarbodiimides do not discolor in the presence of UV light, as do aromatic polycarbodiimides.

A further advantage is that the cross-linking process is much slower than that of the prior art systems incorporating carboxylic acid- and/or carboxylate-containing polymers and an aliphatic polycarbodiimide. It is believed that the cross-linking process may be approximately a hundred times slower. The cross-linking process is slow enough that it substantially occurs during or after film formation with the result that a number of important requirements for a good coating, such as mar resistance, are greatly improved. However, crosslinking is fast enough to be useful in an ambiently cured film in a typical industrial or architectural use.

The present invention therefore rests in the discovery and recognition that a polymer bearing at least two sulfur- and/or phosphorus-containing acid groups reacts more slowly with aliphatic polycarbodiimide crosslinkers than a similar polymer containing carboxylic acid groups, yet still reacts rapidly enough to be useful in commercial applications.

The aliphatic polycarbodiimides of the present invention may be any compound containing two or more aliphatic carbodiimide groups. An aliphatic carbodiimide is defined herein as the grouping X—N=C=N—Y, wherein each of the groups X and Y are attached to the N-atom through an aliphatic C-atom. Examples of useful aliphatic polycarbodiimides include the commercial product Ucarlnk® XL-29SE and formerly commercial products Ucarlnk® XL-20, Ucarlnk®XL-25SE, and Ucarlnk® XL-27HS (all from Union Carbide), the commercial product EX-5558 (from Stahl Holland bv), as well as the compounds described in U.S. Pat. No. 5,081,173, U.S. Pat. No. 5,047,588, U.S. Pat. No. 5,136,006, U.S. Pat. No. 5,373,080, EP-0241805, U.S. Pat. No. 4,487,964, EP-0259511, EP-0274402, EP-0277361, and U.S. Pat. No. 5,258,481. The aliphatic polycarbodiimides may contain functional groups other than aliphatic carbodiimides, provided that these additional functional groups do not interfere with the ability of the polycarbodiimide to crosslink polymers which contain sulfur and/or phosphorus-containing acid groups. In particular, the polycarbodiimide may contain a minority of aromatic carbodiimide groups. The preferred polycarbodiimides contain only aliphatic carbodiimide groups.

The polymer according to the present invention may be any polymer capable of forming a film under the drying/curing conditions to which it is subjected and which contains two or more sulfur and/or phosphorus-containing acid groups. The polymer may be solventborne or waterborne. Examples of suitable polymers are polyacrylates, polyurethanes, polyureas, polyesters, polyethers, and polyepoxides, as well as blends and hybrids such as graft or block copolymers of the listed polymers. The acid groups on the polymer may be totally or partially neutralized. Preferred is an addition polymer formed by the aqueous emulsion polymerixation of ethylenically-unsaturated monomers.

The polymer composition may be selected and the polymer prepared by conventional techniques known to those generally skilled in the art. Preferred are addition polymers. The polymer may contain one or more of the following copolymerized ethylenically unsaturated monomers such as, for example, $C_1$–$C_{22}$ linear or branched chain alkyl (meth)acrylates, bornyl (meth)acrylate, isobornyl (meth)acrylate, and the like; hydroxyethyl (meth)acrylate, hydroxypropyl (meth)acrylate; (meth)acrylamide or substituted (meth)acrylamides; styrene or substituted styrenes; butadiene; vinyl acetate or other vinyl ester; butylaminoethyl (meth)acrylate, di(methyl)aminoethyl (meth)acrylate; a monomer containing a, b-unsaturated carbonyl functional groups such as fumarate, maleate, cinnamate and crotonate and (meth)acrylonitrile. Additionally, a low level of a multi-ethylenically unsaturated monomer such as, for example, 0–10% by weight based on the weight of the polymer of allyl (meth)acrylate, diallyl phthalate, 1,4-butylene glycol di(meth)acrylate, 1,6-hexanediol-di(meth)acrylate, and trimethylolpropane tri(methyl)acrylate may be used. Preferably, the polymer contains one or more of the following copolymerized monomers: 2-(meth)acrylamido-2-methyl-1-propanesulfonic acid, 3-sulfopropyl (meth)acrylate, 2-sulfoethyl (meth)acrylate, and 2-phosphoethyl (meth)acrylate.

The polymer bears at least two sulfur and/or phosphorus-containing acid groups. Preferably, the polymer has an acid number of from 5 to 100, preferably from 10 to 85, more preferably from 10 to 45, and most preferably from 10 to 30.

Most preferably, the binder polymer is predominantly formed from (meth)acrylic monomers or predominantly formed from styrene and (meth)acrylic monomers.

Although the presence of carboxylic acids or carboxylates in the polymer will lead to some precrosslinking of the film, small amounts of carboxylic acids such as may be introduced in to the polymer either adventitiously as impurities or by hydrolysis during or after the polymerization reaction or low levels of copolymerized carboxylic acid-bearing monomers such as (meth)acrylic acid; ethylenically-unsaturated dicarboxylic acid or half ester thereof or the anhydride thereof such as itaconic acid, fumaric acid, maleic acid, monomethyl itaconate, monomethyl fumarate, monobutyl fumarate, and maleic anhydride may be used. As such, polymers which contain both carboxylic acids and sulfur and/or phosphorus-containing acids are within the scope of the present invention. The amount of carboxylic acid groups which can be incorporated into a given polymer without compromising properties that depend on good film formation, such as mar resistance, will depend on the details of the polymer. For example, polymers with low molecular weight such as a weight average molecular weight of 5,000 will be able to tolerate higher carboxylic acid content, up to about 2% copolymerized carboxylic acid monomer by weight based on polymer weight, than polymers with higher molecular weight such as a weight average molecular weight of 5,000,000 which may contain up to about 0.1% copolymerized carboxylic acid monomer by weight based on polymer weight. Other factors which will influence the degree to which a given amount of precrosslinking will diminish film formation, and therefore properties which require good film formation, are the polymer Tg, the level of sulfur or phosphorus-containing acid, the level of coalescing solvent included in the composition, and the gel fraction and molecular structure of the polymer. It is preferred that the polymer contain no carboxylic acid groups.

The ratio of aliphatic polycarbodiimide groups to polymer acid groups may be from 0.05 to 2.0, preferably from 0.25 to 1.0, on an equivalents basis.

Preferably, the aliphatic polycarbodiimide is water-soluble or water-dispersible when used with waterborne polymers, but water-insoluble and non-self dispersing in water when used with solventborne polymers. For example, preferred polycarbodiimides for waterborne coatings would be Ucarlnk® XL-29SE and Ucarlnk® EX-5558, while a preferred polycarbodiimide for solventborne coatings would be Ucarlnk® XL-20.

The crosslinkable composition may be free of organic solvent or it may contain a coalescing solvent. The crosslinkable composition may contain typical coating additives such as binders, fillers, defoamers, other cross-linkers, catalysts, surfactants, stabilizers, anti-flocculants, aqueous or non-aqueous solutions or dispersions of non-reactive polymer (by "non-reactive polymer" herein is meant polymer substantially free from carbodiimide or acid functionality), tackifiers, coalescents, colorants, waxes, anti-oxidants, pigments, and suitable solvents, such as water-miscible solvents.

The crosslinkable composition may be formed by admixing a polymer bearing at least two sulfur- or phosphorous-containing acid groups and an aliphatic polycarbodiimide using conventional mixing techniques as mechanical agitation such as stirring using a motor-driven stirring blade.

The crosslinkable composition may be used, for example, as a wood coating, maintenance coating, metal primer or coating, plastic coating, traffic paint, coating on previously painted or weathered substrates, woven or nonwoven textile saturant or coating, leather coating, coil coating, architectural coating, mastic, sealant, caulk, board coating, paper coating, plastics coating, ink, overcoat varnish, flooring coating, and adhesive. The crosslinkable composition of this invention may be applied by methods well known in the art such as air-assisted spray, airless spray, plural component spray, brush, roller squeege, roll coater, curtain coater, and the like.

After the crosslinkable composition is applied to a substrate the composition cures, that is, reaction between the carbodiimide functionality and the sulfur- or phosphorous-containing acid functionality is believed to occur. Curing to yield useful properties may take place at a convenient rate at ambient temperatures such as, for example, from 0° C. to 35° C. However, it is sometimes desirable to accelerate the rate of property development by heating the applied crosslinkable composition to a temperature from 25° C. to 200° C. Preferred is a curing temperature from 25° C. to 60° C.

"Acid Number" herein is the mg. of KOH required to neutralize 1 g. of solid polymer. "Hydroxyl number" herein is the mg. of KOH which make a molar equivalent to the amount of —OH groups in 1 g. of solid polymer. "Amine Number" herein is the mg. of KOH which make a molar equivalent to the amount of —NH2 groups in 1 g. of solid polymer.

EXAMPLE 1

Preparation of Crosslinkable Compositions

The following series of polymer samples were prepared.

TABLE 1.1

Polymer compositions

| REF | POLYMER | ACID FUNCTIONALITY |
|---|---|---|
| P.1 | Styrene/acrylic polymer; Acid No. = 9.0 | AMPS |
| P.2 | Styrene/acrylic polymer; Acid No. = 13.0 | MAA |
| P.3 | Acrylic polymer; Acid No. = 17.9 | PEM |
| P.4 | Acrylic polymer; Acid No. = 17.9 | AA |
| P.5 | Acrylic polymer; Acid No. = 16.4 | AMPS |
| P.6 | Styrene/acrylic polymer; Acid No. = 32.5 | MAA | where:

AMPS=2-acrylamido-2-methyl-1-propanesulfonic acid

PEM=2-phosphoethyl methacrylate

MAA=methacrylic acid

AA=acrylic acid

The following series of crosslinkable compositions were prepared as follows: The order of mixing was from left to right (the quantities are given in grams of solid or active ingredients.) The following abbreviations are used:

NMP=n-methyl pyrrolidone

EB=ethylene glycol, butyl ether

DB=diethylene glycol, butyl ether

PE wax=emulsified polyethylene wax

TABLE 1.2

Crosslinkable Composition C1 and Comparative Compositions CA–CE

| Ref | Pol. | NMP | EB | DB | Byk 301 | PE wax | Ucarlnk XL-29SE |
|---|---|---|---|---|---|---|---|
| CA | 100R.1 | 0 | 20 | 10 | 1 | 3 | |
| C1 | 100R.1 | 0 | 20 | 10 | 1 | 3 | 10.2 |
| CB | 100R.2 | 7.5 | | | | | |

TABLE 1.2-continued

Crosslinkable Composition C1 and Comparative Compositions CA–CE

| Ref | Pol. | NMP | EB | DB | Byk 301 | PE wax | Ucarlnk XL-29SE |
|---|---|---|---|---|---|---|---|
| CC | 100R.2 | 7.5 | | | | | 9.5 |
| CD | 100R.6 | 7.5 | | | 1 | 3 | |
| CE | 100R.6 | 7.5 | | | 1 | 3 | 23.8 |

TABLE 1.3

Crosslinkable Composition C2 and Comparative Compositions CF–CH

| Ref | Resin | EB | DB | Byk 301 | PE wax | Ucarlnk XL-29 S E | EX5558 CF |
|---|---|---|---|---|---|---|---|
| | 100R.1 | 20 | 10 | 1 | 3 | | |
| C2 | 100R.1 | 20 | 10 | 1 | 3 | 5.1 | |
| CG | 100R.1 | 20 | 10 | 1 | 3 | | 5.1 |
| CH | 100R.1 | 20 | 10 | 1 | 3 | | 10.2 |

TABLE 1.4

Crosslinkable Composition C3 and Comparative Compositions CI–CL

| Ref | Resin | EB | DB | Byk 301 | PE wax | Ucarlnk XL-29 SE | QRXP 1422PMN |
|---|---|---|---|---|---|---|---|
| CI | 100R.3 | 10 | 10 | 1 | 3 | | |
| C3 | 100R.3 | 10 | 10 | 1 | 3 | 11 | |
| CJ | 100R.4 | 10 | 10 | 1 | 3 | | |
| CK | 100R.4 | 10 | 10 | 1 | 3 | 11 | |
| CL | 100R.4 | 10 | 10 | 1 | 3 | | 8.2 |

TABLE 1.5

Crosslinkable Composition C4 and Comparative Compositions CM–CP

| Ref | Resin | EB | DB | Byk 301 | PE wax | Ucarlnk XL-29SE | QRXP-1422PMN |
|---|---|---|---|---|---|---|---|
| CM | 100R.5 | 10 | 10 | 1 | 3 | | |
| C4 | 100R.5 | 10 | 10 | 1 | 3 | 12 | |
| CN | 100R.4 | 10 | 10 | 1 | 3 | | |
| CO | 100R.4 | 10 | 10 | 1 | 3 | 12 | |
| CP | 100R.4 | 10 | 10 | 1 | 3 | | 9 |

QRXP-1422PMN is an aromatic polycarbodiimide made by Rohm and Haas Company

EXAMPLE 2

Preparation of Films of Crosslinkable Compositions for Testing and Test Procedures Films of the prepared crosslinkable compositions were cast on either aluminum panels, cherry veneer plywood, or white and black painted metal panels (Leneta Co., Product code T12-10). he films were cast at a 7 to 10 mil wet film thickness. The films were air-dried at ambient temperature for 3 to 4 days prior to testing. The samples were then tested according to the following established test procedures.

Mar Resistance Test

This test measured the resistance of a coating surface to marring as measured by the extent of damage done to a coating when it is struck with a finger nail. In this test, panels are coated with samples and then cured. The cured samples are then tested for mar resistance by two methods. The first method ("surface mar") was striking the coating vigorously several times with the back of a fingernail. The second method ("dig-in mar") was trying to dig the finger nail into the coating. Each coating was then rated for each method on a scale from 0 to 10 with 10=no mark. The results were reported as two values (x/y) corresponding to ratings for each respective method. An improvement of 1 is an important advantage.

Mek Rub Resistance Test

This test measured the extent of damage done to a coating on a panel when exposed to methyl ethyl ketone (MEK). A swatch of cheese cloth was saturated with MEK. Then, by use of a Crockmeter (Atlas Electric Devices Inc.) the cloth was rubbed on the coating on the panel. The value recorded was the number of rubs when breakthrough to the panel was first observed. The data were reported as double rubs (one set of back and forth). The higher the number of rubs, the better the coating film.

Composite Stain Test

This test measured the extent of staining of a coating film on a panel after exposure to various solutions. The stains for the composite stain were water, 50% EtOH, Formula 409", and 9% aqueous acetic acid. The stain agents were in contact with the film for 16 hours and were covered with a watch glass to prevent evaporation. Each stain was done separately and the results were averaged. The data were presented as initial rating/rating after 24 hours recovery. The data were recorded on a scale of 0–10 wherein 10 is best.

Acetone Spot Test

This test is similar to the Composite Stain test except that the stain solution was acetone and the film was exposed for 15 minutes. The data were presented as initial rating/rating after 24 hours recovery. The data were recorded on a scale of 0–10 wherein 10 is best.

Quv Test

The white section of a Leneta panel was coated and cured. Readings of extent of yellowness were made with a Pacific Scientific ColorGuard System 5 using the Hunter L*a*b* scale. b* is a measure of yellowness where a larger positive value of b* indicates a more yellow film. After taking initial b* values, the panels were placed in a Q-U-V machine from The Q-Panel Company outfitted with QUV-A bulbs, and exposed for 24 hrs, then the change in b* was measured.

Examples 3–6 show that the crosslinkable compositions according to the present invention(C1–C4) display properties, such as mar resistance and solvent resistance, that are better than both the uncrosslinked coatings and the prior art coating compositions containing polymers with carboxylic acids crosslinked with aliphatic polycarbodiimides, and as good as the prior art coating compositions containing carboxylic acid-bearing polymers crosslinked with aromatic polycarbodiimides. Also, it is shown that the coating compositions according to the present invention have less tendency to yellow upon exposure to UV light than do coating compositions containing aromatic polycarbodiimides.

EXAMPLE 3

Evaluation of Crosslinkable Composition C1
Substrate: Aluminum (MEK rubs, mar) and plywood (acetone spot and stains)

| Composition | CA | C1 | CB | CC | CD | CE |
|---|---|---|---|---|---|---|
| MEK rubs | 3 | 100 | — | — | 6 | 10 |
| Acetone spot test | 0/0 | 5/8 | — | — | — | — |
| Composite stain test | 4.8/6.8 | 6.3/8.9 | — | — | — | — |
| Mar test | 5/5 | 7.5/7.5 | 3/3 | 3/3 | 5/4 | 5/4 |

EXAMPLE 4

Evaluation of Crosslinkable Composition C2
Substrate: Aluminum

| Composition | CF | C2 | CG | CH |
|---|---|---|---|---|
| MEK rubs | 3 | 20 | 40 | 100 |
| Acetone spot test | 0/0 | 6/7 | 6/7 | 6/7 |
| Composite stain test | 0.5/6.0 | 2.0/7.5 | 3.3/8.3 | 6.0/8.1 |
| Mar test | 5/5 | 7.5/7.5 | 3/3 | 3/3 |

EXAMPLE 5

Evaluation of Crosslinkable Composition C3
Substrate: Aluminum

| Composition | CI | C3 | CJ | CK | CL |
|---|---|---|---|---|---|
| Acetone spot test | 0/0 | 6/7 | 0/0 | 3/3 | 6/7 |
| Mar test | 5/5 | 5/5 | 5/5 | 3/3 | 5/5 |

EXAMPLE 6

Evaluation of Crosslinkable Composition C4
Substrate: Leneta panels (QUV) and aluminum (mar)

| Composition | CM | C4 | CN | CO | CP |
|---|---|---|---|---|---|
| QUV initial b* | −0.2 | 0.1 | 0.1 | 0.1 | 0.2 |
| QUV final b* | −0.7 | 0.8 | 0.0 | 0.8 | 7.8 |
| Mar test | 6/6 | 6/8 | 5/6 | 4/4 | 6/7 |

EXAMPLE 7

Evaluation of Crosslinkable Composition C5 in comparison with Comparative Compositions Containing Various Functional Groups having Active Hydrogen Atoms The aliphatic polycarbodiimide of U.S. Pat. No. 5,353,400, Example 12 ("'400") was prepared and used in this Example.

Polymers used are given in Table 7.1

TABLE 7.1

| Polymer functionalities. | |
|---|---|
| Polymer | Functionality Type and Amount |
| P.7 | carboxylic acid, acid number = 20 |
| P.8 | primary amine, amine number = 39 |
| P.9 | alcohol, hydroxyl number = 121 |
| P.10 | phosphonic acid, acid number = 12 |

Compositions were prepared using the quantities in grams given in Table 7.2

TABLE 7.2

| Composition | Polymer | EB | BuAc | CDI '400 |
|---|---|---|---|---|
| CQ | 25 P.7 | 2 | 0 | 0 |
| CR | 25 P.7 | 2 | 0 | 2.38 |
| CS | 25 P.8 | 2 | 0 | 0 |
| CT | 25 P.8 | 2 | 0 | 3.08 |
| CU | 5 P.9 | 0 | 4 | 0 |
| CV | 5 P.9 | 0 | 4 | 2.76 |
| CW | 25 P.10 | 2 | 0 | 0 |
| C5 | 25 P.10 | 2 | 0 | 1.62 |

The compositions were drawn down at a wet film thickness of 0.25 mm. on maple veneer plywood and dried for 24 hours at room temperature. Test results are presented in Table 7.3

TABLE 7.3

| Composition | Acetone Spot Test | Comments |
|---|---|---|
| CQ | 0/0 | dissolved |
| CR | 1/3 | cracked |
| CS | 0/0 | dissolved |
| CT | 0/0 | dissolved |
| CU | 0/0 | dissolved |
| CV | 0/0 | dissolved |

TABLE 7.3-continued

| Composition | Acetone Spot Test | Comments |
|---|---|---|
| CW | 0/0 | dissolved |
| C5 | 4/8 | slight gloss loss |

Crosslinkable composition C5 of this invention exhibits unexpectedly surprising crosslinking capability as measured by acetone spot resistance when compared to the performance of comparative compositions CQ–CW.

What is claimed is:

1. A method for crosslinking a polymer composition comprising;

forming a polymer bearing at least two sulfur- or phosphorous-containing acid groups, said polymer comprising at least one copolymerized monomer selected from monomers consisting of 2-(meth)acrylamido-2-methyl-1-propanesulfonic acid, 3-sulfopropyl (meth)acrylate, 2-sulfoethyl (meth)acrylate, and 2-phosphoethyl (meth)acrylate, and wherein said polymer has an acid number of from 5 to 100; admixing an aliphatic polycarbodiimide; and curing said polymer composition.

2. The method of claim 1 wherein said polymer is an aqueous dispersion of water-insoluble addition polymer formed by emulsion polymerization.

* * * * *